(12) United States Patent
Pusheck

(10) Patent No.: US 8,956,053 B2
(45) Date of Patent: Feb. 17, 2015

(54) BEARING RETAINER ASSEMBLY

(75) Inventor: Bernard Pusheck, Cudahy, WI (US)

(73) Assignee: Harnischfeger Technologies, Inc., Wilmington, DE (US)

(*) Notice: Subject to any disclaimer, the term of this patent is extended or adjusted under 35 U.S.C. 154(b) by 529 days.

(21) Appl. No.: 13/307,087

(22) Filed: Nov. 30, 2011

(65) Prior Publication Data

US 2012/0132737 A1  May 31, 2012

Related U.S. Application Data

(60) Provisional application No. 61/458,692, filed on Nov. 30, 2010.

(51) Int. Cl.
*F16C 43/00* (2006.01)
*B02C 4/28* (2006.01)
*F16C 35/073* (2006.01)
*F16C 19/38* (2006.01)

(52) U.S. Cl.
CPC ............. *B02C 4/28* (2013.01); *F16C 35/073* (2013.01); *F16C 19/386* (2013.01)
USPC .......................................... 384/537; 384/540

(58) Field of Classification Search
CPC ......... F16C 35/06; F16C 35/063; F16C 35/07
USPC .................. 384/537, 538, 541, 584, 540
See application file for complete search history.

(56) References Cited

U.S. PATENT DOCUMENTS 3,239,292 A * 3/1966 Howe, Jr. et al. ............ 384/541
3,294,459 A * 12/1966 Howe, Jr. ..................... 384/541
4,763,845 A 8/1988 Guggenheimer et al.
5,441,206 A 8/1995 Schade et al.
5,560,687 A * 10/1996 Hagelthorn ................ 301/105.1
7,063,490 B2 * 6/2006 Ricker ............................. 411/14
7,788,786 B2 * 9/2010 Hewitt et al. .............. 29/525.11
8,020,800 B2 9/2011 Potts
2011/0013861 A1 1/2011 Wendeberg et al.

FOREIGN PATENT DOCUMENTS

WO  99/54049  10/1999
WO  2004/018106  3/2004

OTHER PUBLICATIONS

First Examination Report from the Australian Government for Application No. 2011253647 dated Sep. 4, 2013 (4 pages).

* cited by examiner

*Primary Examiner* — Phillip A Johnson
(74) *Attorney, Agent, or Firm* — Michael Best & Friedrich LLP

(57) ABSTRACT

A retainer assembly for securing a bearing relative to a shaft in a first axial direction. The retainer assembly includes a collar, a lock ring, and a retaining nut. The collar includes a first portion, a second portion, and a bore extending through the first portion and the second portion. The first portion includes external threads, and the second portion includes an internal recess extending circumferentially around the bore. The lock ring is located within the internal recess such that the lock ring is positioned between the second portion of the collar and the shaft and is removably coupled to the shaft. The retaining nut includes internal threads that threadingly engage the external threads of the first portion.

22 Claims, 4 Drawing Sheets

BEARING RETAINER ASSEMBLY

BACKGROUND

The present invention relates to the field of mining sizers. Specifically, the present invention relates to shaft bearings for a mining sizer shaft.

In a conventional bearing assembly for a rotating shaft, the bearing is coupled to the shaft by a sleeve or collar, or by a lock nut that is threaded onto the shaft. This typically requires a high-precision manufacturing process to either machine a portion of the shaft to a specific diameter so that the sleeve can be press fit onto the shaft after the bearing is installed or to machine threads on the shaft to engage the lock nut. Mounting the bearing on the shaft and machining the shaft are processes that require considerable time and cost in order to insure that the bearing is properly aligned and the shaft portion is within a fine tolerance to receive the sleeve. In addition, the machining of the shaft portion reduces the diameter of the shaft, which decreases the overall shaft strength. The reduced diameter also creates a stress concentration in the region where the shaft diameter is reduced. This decreases the working life of the shaft and increases the frequency of replacement.

SUMMARY

In one embodiment, the invention provides a retainer assembly mounted on a shaft, the shaft defining an axis. The retainer assembly is positioned adjacent a bearing mounted on the shaft and secures the bearing against movement relative to the shaft in a first axial direction. The retainer assembly includes a collar, a lock ring, and a retaining nut. The collar includes a first portion, a second portion, and a bore extending through the first portion and the second portion. The first portion includes external threads, and the second portion includes an internal recess extending circumferentially around the bore. The lock ring is located within the internal recess such that the lock ring is positioned between the second portion of the collar and the shaft and is removably coupled to the shaft. The retaining nut includes internal threads that threadingly engage the external threads of the first portion.

In another embodiment, the invention provides a sizer for a mining crusher. The sizer includes a crushing chamber, at least one rotating shaft extending through the crushing chamber, at least one bearing for rotatably supporting the shaft, and a retainer assembly. The at least one rotating shaft defines an axis and includes a first end and a second end. The retainer assembly secures the bearing against movement in a first axial direction. The retainer assembly includes a collar, a lock ring, and a retaining nut. The collar includes a first portion, a second portion, and a bore extending through the first portion and the second portion. The first portion includes external threads, and the second portion includes an internal recess extending circumferentially around the bore. The lock ring is located within the internal recess such that the lock ring is positioned between the second portion of the collar and the shaft and is removably coupled to the shaft. The retaining nut includes internal threads that threadingly engage the external threads.

In yet another embodiment, the invention provides a method for securing a bearing relative to a shaft. The shaft defines an axis. The method includes: providing a shaft including a first end and a second end, the shaft defining an axis such that a line drawn from the second end toward the first end defines a first axial direction, and a line drawn from the first end toward the second end defines a second axial direction; mounting the bearing on the shaft proximate the first end; inserting a retaining nut onto the shaft between the first end of the shaft and the bearing, the retaining nut including a first end adjacent the bearing, a second end opposite the first end, and internal threads; inserting a collar onto the shaft adjacent to the retaining nut, the collar including a first portion, a second portion, and a bore extending through the first portion and the second portion, the first portion including external threads, the second portion including an internal recess extending circumferentially around the bore; threading the retaining nut onto the external threads on the second portion of the collar; inserting a lock ring around the shaft outer surface and positioning the lock ring within the internal recess; removably coupling the lock ring to the shaft, such that the lock ring prevents movement of the collar in the first axial direction; and adjusting the position of the retaining nut on the external threads to abut the bearing, wherein the retaining nut exerts an axial force on the bearing in the second axial direction, securing the bearing against movement in the first axial direction.

In yet another embodiment, the invention provides a retainer assembly for securing a bearing mounted on a shaft. The shaft defines an axis, and the retainer assembly secures the bearing against movement in a first axial direction. The retainer assembly includes a collar, a means for removably coupling the collar to the shaft such that the collar is secured against movement relative to the shaft, and a means for applying a retaining force on the bearing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Although the invention is described below as it relates to a roll sizer, it is important to note that the invention is applicable to virtually any type of rotating shaft that is rotatably supported by bearings.

Figure 1:
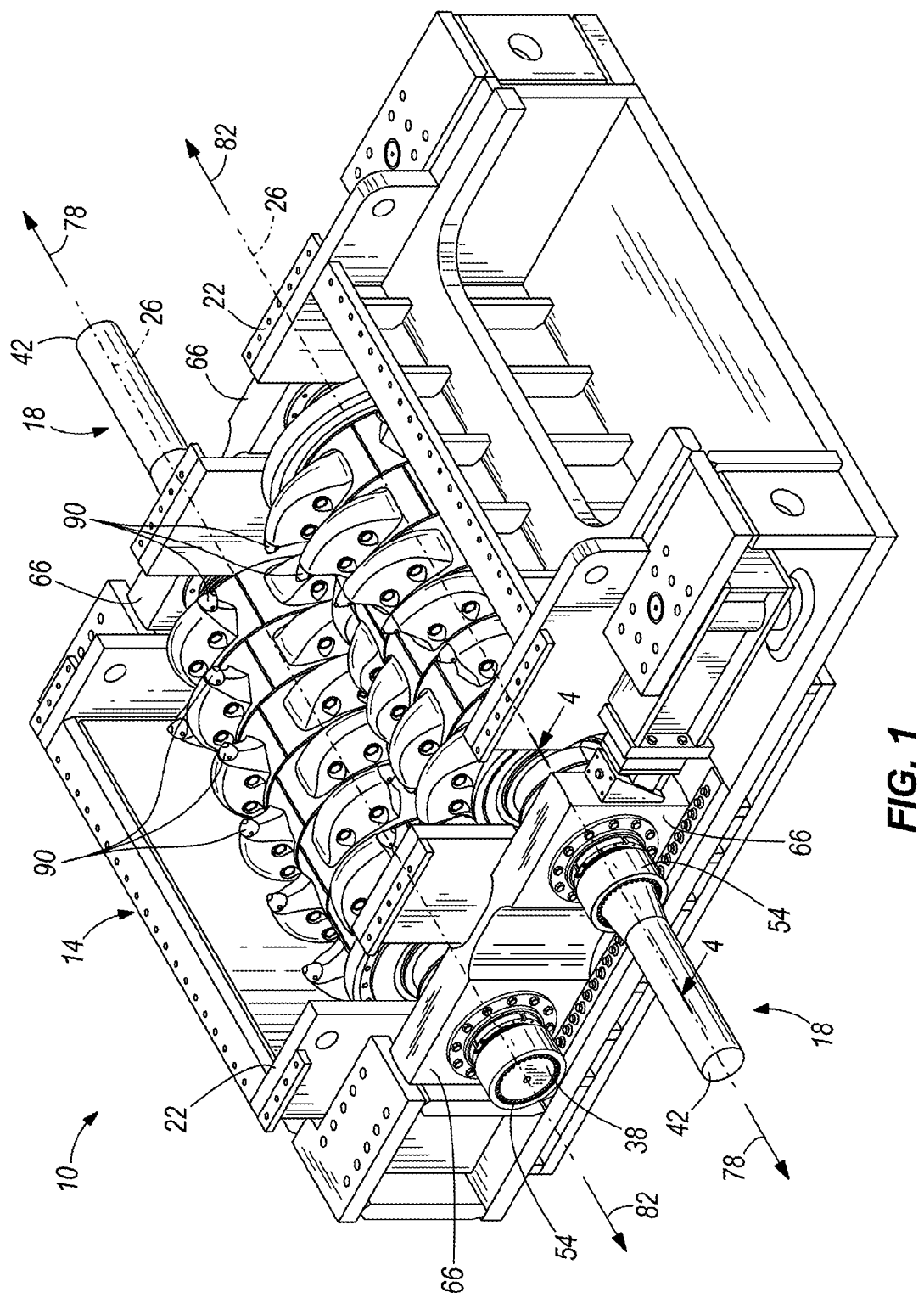
FIG. 1 is a perspective view of a roll sizer of the present invention.

As shown in FIG. 1, a sizer 10 for a mobile mining crusher includes a crushing chamber 14 and a pair of rotating shafts 18. The crushing chamber 14 includes a pair of support walls 22. The shafts 18 extend through the walls 22 of the crushing chamber 14. Each shaft 18 includes a terminal end 38, a drive end 42 opposite the terminal end 38, bearings 50 (FIG. 4), and bearing retainer assemblies 54. The drive end 42 of each shaft 18 is coupled to a motor (not shown) for rotating the shafts 18. The bearings 50 (FIG. 4) support the shaft for rotation and are positioned proximate the drive end 42 and the terminal end 38 of the shaft. Each bearing 50 is located within a bearing housing 66.

Figure 4:
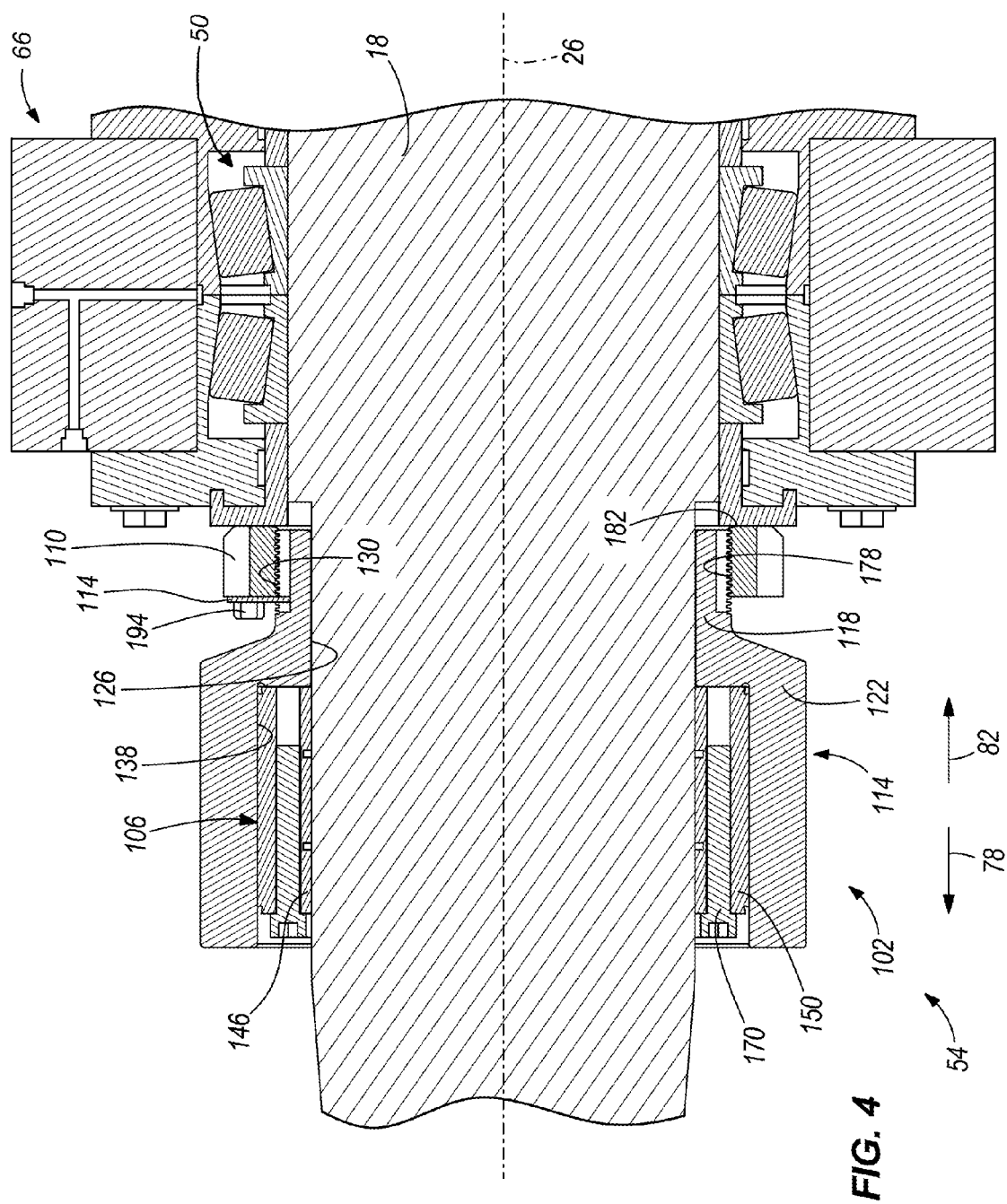
FIG. 4 is a section view of a shaft of the roll sizer shown in FIG. 1 taken along line 4-4.

Referring to FIG. 1, each shaft 18 defines a longitudinal axis 26. As used herein, the term "axial" or variants thereof refer to a direction that is parallel to the axis 26, while the term "radial" or variants thereof refer to a direction that is perpendicular to the axis 26. A first axial direction 78 extends from the terminal end 38 toward the drive end 42 of the shaft 18. A second axial direction 82 opposite the first axial direction 78 extends from the drive end 42 toward the terminal end 38. As shown in FIGS. 1 and 4, the bearing 50 proximate the drive end 42 is retained on the shaft 18 in a first axial direction 78 by one of the retainer assemblies 54. Similarly, the bearing 50 proximate the terminal end 38 is retained on the shaft 18 in a second axial direction 82 by the retainer assembly 54.

In the embodiment shown in FIG. 1, the shafts 18 are generally parallel but the terminal ends 38 of the shafts 18 are located on opposite walls 22 of the crushing chamber 14, and the drive ends 42 of the shafts 18 are located on opposite walls 22. Multiple picks 90 are removably coupled to the shafts 18, and the shafts 18 are counter-rotating. That is, the shafts 18 rotate in a counter-clockwise direction when viewed from the drive end 42. Stated differently, the shafts 18 rotate in opposite directions so that the picks 90 rotate over the top of each shaft 18 and toward the other shaft 18. During operation, objects such as pieces of mineral are placed in the crushing chamber 14 from above the chamber 14. As the shafts 18 rotate, the picks 90 move the objects into a position between the shafts 18, crushing and breaking apart the objects. The picks 90 are offset along each shaft 18 such that the picks 90 do not contact one another during rotation. In other embodiments, the shafts 18 may be aligned in a true parallel manner, such that the drive ends of each shaft are located on the same support wall 22. The shafts 18 may also have other rotation configurations. The roll sizer 10 may include only one shaft 18.

Figure 2:
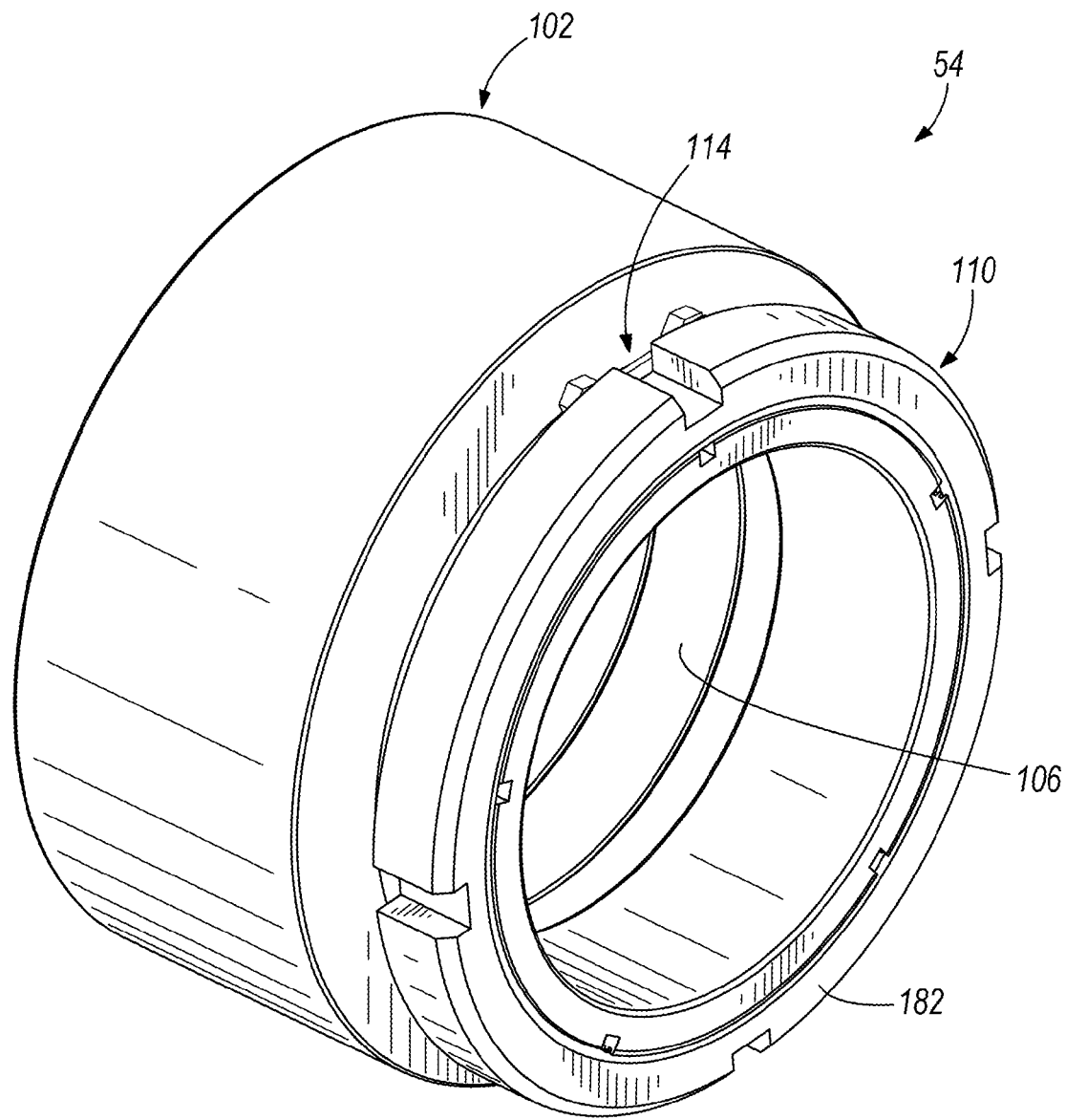
FIG. 2 is a perspective view of a retaining collar.
Figure 3:
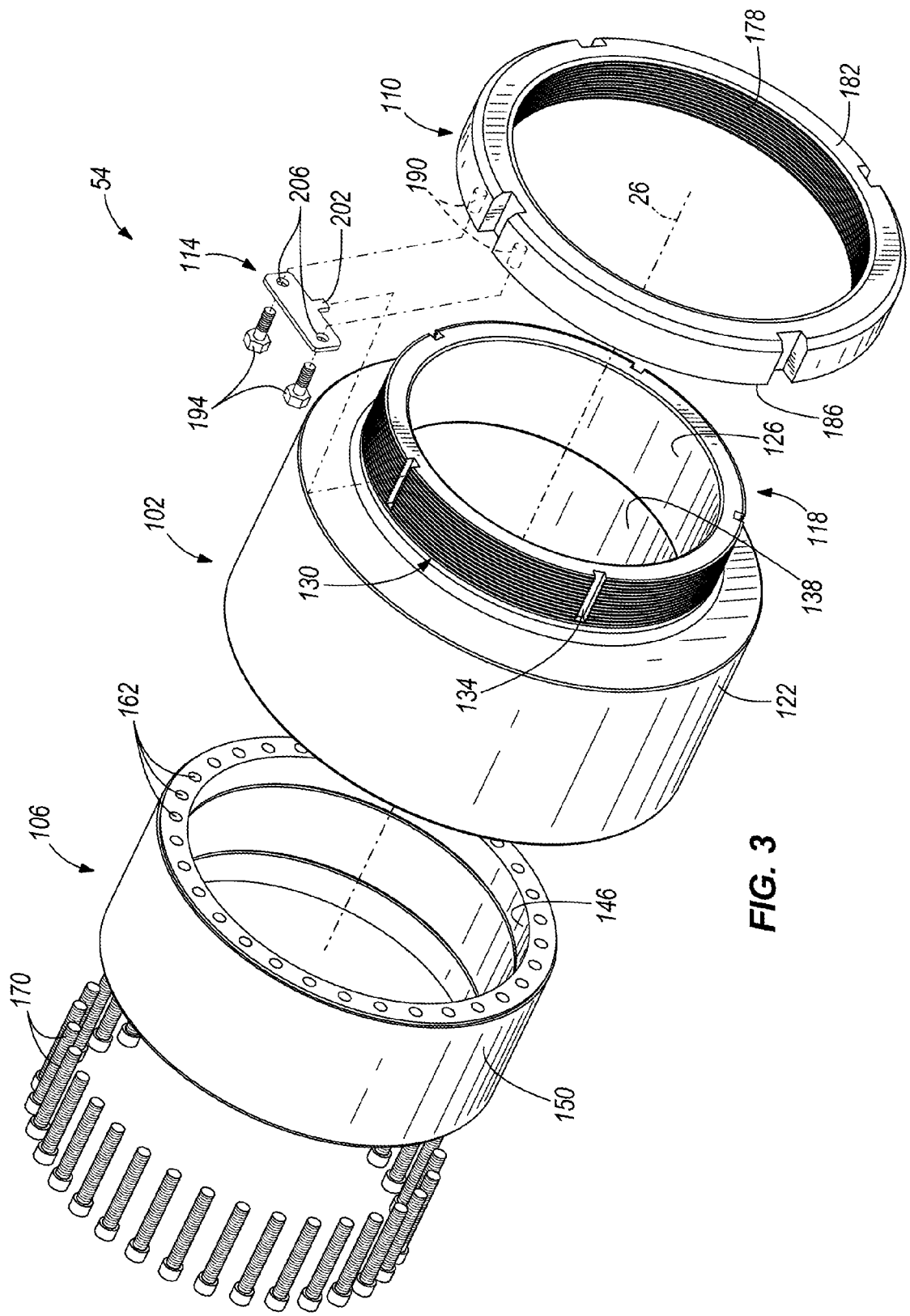
FIG. 3 is an exploded perspective view of the retaining collar shown in FIG. 2.

As shown in FIGS. 2 and 3, the retainer assembly 54 includes a collar 102, a lock ring 106, a retaining nut 110, and a lock plate 114. As shown in FIG. 3, the collar 102 includes a first portion 118, a second portion 122, and a bore 126 extending through the first portion 118 and the second portion 122. The bore 126 has a diameter that is approximately equal to the diameter of the shaft 18. The first portion 118 includes external threads 130 and at least one axial slot 134 located in the external threads 130. In the illustrated embodiment, the collar 102 includes multiple axial slots 134 positioned at regular angular intervals around the circumference of the first portion 118. In other embodiments, the collar 102 may include fewer or more axial slots 134. The second portion 122 includes an internal recess 138 extending circumferentially around the bore 126.

As best shown in FIG. 4, the lock ring 106 is located within the internal recess 138 such that the lock ring 106 is positioned between the second portion 122 of the collar 102 and the shaft 18 and is removably coupled to the shaft 18. As used herein, the term "removably coupled" may refer to fastening, bolting, interlocking, press fitting, or any of various methods for connecting two members. Referring to FIGS. 3 and 4, the lock ring 106 includes an inner ring 146, an outer ring 150, and a plurality of holes 162 extending longitudinally through the lock ring 106. The inner ring 146 is located adjacent the shaft 18. The holes 162 are positioned circumferentially around the lock ring 106 and are adapted for receiving a fastener, such as a bolt 170. Inserting a bolt 170 into each of the holes 162 reduces the inner circumference of the inner ring 146. The lock ring 106 is removably coupled to the shaft 18 by inserting a bolt 170 into each of the holes 162 to tighten the inner ring 146 against the shaft 18, exerting a radial compressive force on the shaft 18. The bolts 170 also cause the outer ring 150 to exert a radial tension force on the second portion 122 of the collar 102. In other embodiments, other types of fasteners may be used. In still other embodiments, the lock ring 106 may be removably coupled to the shaft 18. The lock ring 106 constitutes a means for removably coupling the collar 102 onto the shaft 18.

Referring to FIGS. 2 and 3, the retaining nut 110 includes internal threads 178, a first end surface 182 adapted to abut the bearing 50, a second end surface 186 facing opposite the first end surface 182, and a plurality of pairs of holes 190 (one pair is shown hidden in FIG. 3). The internal threads 178 threadingly engage the external threads 130 of the collar 102. Because the retaining nut 110 is removably coupled to the external threads 130, the first end surface 182 exerts an axial pre-load force on the bearing 50 in the second axial direction 82 (FIG. 4). The axial pre-load force can be adjusted by tightening or loosening the retaining nut 110 on the external threads 178. The pairs of holes 190 are located on the second end surface 186 and are spaced around the circumference of the retaining nut 110. The holes 190 extend axially through the retaining nut 110 toward the first end surface 182 and each hole 190 is adapted for receiving a fastener, such as a bolt 194. The retaining nut 110 constitutes a means for applying a retaining force on the bearing 50. The internal threads 178 and the external threads 130 constitute a means for adjusting the retaining force applied by the retaining nut 110.

The lock plate 114 includes a tab 202 and a pair of holes 206 adapted for receiving fasteners 194. The tab 202 is positioned within one of the axial slots 134 on the external threads 130 of the collar 102. The lock plate 114 is removably coupled to the retaining nut 110 by passing at least one fastener 194, such as a bolt, through the lock plate 114 and into one of the retaining nut holes 190. In other embodiments, the lock plate 114 may be removably coupled to the retaining nut 110 by another type of connection.

Referring to FIGS. 3 and 4, after the bearing 50 is secured within the bearing housing 66 (FIG. 4) and positioned around the shaft 18, the retainer assembly 54 is assembled by inserting the retaining nut 110 over the drive end 42 of the shaft 18 and positioning the retaining nut 110 adjacent the bearing 50. Next, the collar 102 is inserted onto the shaft 18 adjacent the retaining nut 110. The internal threads 178 of the retaining nut 110 are threaded onto the external threads 130 on the second portion 122 of the collar 102. Then, the lock ring 106 is inserted around the shaft 18 and positioned in the internal recess 138 such that the lock ring 106 is located between the shaft 18 and the second portion 122 of the collar 102. The lock ring 106 is removably coupled to the shaft 18 by passing fasteners 170 into the holes 162 on the circumference of the lock ring 106 and tightening the fasteners 170 until the inner ring 150 exerts a desired radial compressive force on the shaft 18. The lock ring 106 thus removably couples the collar 102 to the shaft 18 relative to the first axial direction 78.

The retaining nut 110 is then tightened or loosened on the external threads 130 of the collar 102 to adjust the axial pre-load force exerted against the bearing 50 until the axial force is within a desired range. Once the retaining nut 110 has been set, the lock plate 114 is aligned on the second end surface 186 of the retaining nut 110 such that the tab 202 is positioned within one of the axial slots 134 on the external threads 130 of the collar 102 and the holes 206 are aligned with a pair of holes 190 on the retaining nut 110. A fastener 194 is then passed through each of the holes 190 to removably couple the lock plate 114 to the retaining nut 110. The retainer assembly 54 is thus removably coupled to the shaft 18 such that the retaining nut 110 is adjacent the bearing 50, preventing movement of the bearing 50 relative to the shaft 18 in the first axial direction 78.

The retainer assembly 54 secures the bearing 50 on the shaft 18 without requiring the shaft 18 to be machined to a precise tolerance. The retainer assembly 54 thus simplifies the manufacture of the shaft 18 and assembly of the shaft bearing 50. Since the shaft 18 requires fewer machined surfaces, the retainer assembly 54 reduces the number of stress concentrations in the shaft 18, improving the stress conditions within the shaft 18 and increasing the overall life of the shaft 18. This allows use of a shaft 18 with a smaller maximum diameter and smaller bearings 50. At the same time, the retainer assembly 54 provides adjustability of the pre-load on the bearing 50. Because the retainer assembly 54 is removably coupled to the shaft 18 by the combination of the compressive force exerted by the lock ring 106 on the shaft 18 and the tension exerted by the lock ring 106 on the collar 102, the retaining nut 110 is able to provide a constant axial pre-load force on the bearing 50.

Thus, the invention provides, among other things, a retainer assembly for a shaft bearing. Various features and advantages of the invention are set forth in the following claims.

What is claimed is:

1. A retainer assembly mounted on a shaft, the shaft defining an axis, the retainer assembly positioned adjacent a bearing mounted on the shaft and securing the bearing against movement relative to the shaft in a first axial direction, the retainer assembly comprising:
    a collar including a first portion, a second portion, and a bore extending through the first portion and the second portion, the first portion including external threads, the second portion including an internal recess extending circumferentially around the bore;
    a lock ring located within the internal recess such that the lock ring is positioned between the second portion of the collar and the shaft and is removably coupled to the shaft; and
    a retaining nut including internal threads that threadingly engage the external threads on the first portion.

2. The retainer assembly of claim 1, wherein the retaining nut abuts the bearing and exerts an axial force on the bearing in a second axial direction opposite the first axial direction.

3. The retainer assembly of claim 2, wherein tightening and loosening the retaining nut adjusts the axial force on the bearing.

4. The retainer assembly of claim 1, further comprising a lock plate for securing the retaining nut against rotation about the external threads.

5. The retainer assembly of claim 4, the collar further including a plurality of axial slots positioned in the external threads at regular angular intervals, the lock plate further including a tab, wherein the lock plate is positioned such that the tab is located within one of the axial slots in the external threads.

6. The retainer assembly of claim 5, the retaining nut further including a first end surface adjacent the shaft bearing, a second end surface opposite the first end surface, and a plurality of holes located on the second end surface and extending axially through the retaining nut, the lock plate including at least one hole for receiving a fastener, and the lock plate is fastened to the retaining nut by passing a fastener through the lock plate hole and into one of the retaining nut holes.

7. The retainer assembly of claim 1, the lock ring further including an inner ring, an outer ring, and a plurality of holes extending axially through the lock ring, the inner ring being located adjacent the shaft, the holes being positioned circumferentially around the first end surface, wherein inserting a fastener into each of the holes tightens the inner ring, exerting a radial compressive force on the shaft.

8. The retainer assembly of claim 7, wherein inserting a fastener into each of the holes of the lock ring causes the outer ring to exert a radial tension force on the collar.

9. A retainer assembly for securing a bearing mounted on a shaft, the shaft defining an axis, the retainer assembly securing the bearing against movement in a first axial direction, the retainer assembly comprising:
    a collar including a first portion, a second portion, and a bore extending through the first portion and the second portion;
    a means for removably coupling the collar to the shaft adjacent the bearing such that the collar is secured against movement relative to the shaft; and
    a means for applying a retaining force on the bearing.

10. The retainer assembly of claim 9, further comprising a means for adjusting the retaining force applied on the bearing.

11. The retainer assembly of claim 10, wherein the means for applying a retaining force on the bearing includes a retaining nut threadingly engaging the collar, and wherein the means for adjusting the retaining force applied on the bearing includes tightening and loosening the retaining nut.

12. The retainer assembly of claim 9, wherein the means for removably coupling the collar to the shaft includes a lock ring positioned at least partially between the second portion of the collar and the shaft, the lock ring including an inner ring and an outer ring, the inner ring biased toward the center of the bore to engage the shaft.

13. The retainer assembly of claim 12, wherein the lock ring includes at least one hole extending parallel to the bore and a fastener positioned in the hole, the fastener biasing the inner ring inwardly against the shaft.

14. The retainer assembly of claim 13, wherein the fastener biases the outer ring outwardly against the collar.

15. A retainer assembly for securing a bearing against movement relative to a shaft in a first direction parallel to an axis of the shaft, the retainer assembly comprising:
    a collar defining a bore for receiving the shaft, the collar including a first portion having external threads and a second portion;
    a lock ring located at least partially within the second portion of the collar such that the lock ring is positioned between the second portion of the collar and the shaft, the lock ring including an inner ring and an outer ring, the inner ring biased toward the center of the bore to engage the shaft; and
    a retaining nut including internal threads that threadingly engage the external threads on the collar.

16. The retainer assembly of claim 15, wherein the retaining nut abuts the bearing and exerts an axial force on the bearing in a second axial direction opposite the first axial direction.

17. The retainer assembly of claim 16, wherein tightening and loosening the retaining nut adjusts the axial force exerted on the bearing.

18. The retainer assembly of claim 15, further comprising a lock plate engaging the retaining to secure the retaining nut against rotation about the external threads.

19. The retainer assembly of claim 18, wherein the collar includes a plurality of axial slots positioned in the external threads, the lock plate further including a tab, wherein the lock plate is positioned such that the tab is located within one of the axial slots in the external threads.

20. The retainer assembly of claim 19, wherein the retaining nut includes a first end surface adjacent the bearing, a second end surface opposite the first end surface, and the lock plate is fastened to the second end surface of the retaining nut.

21. The retainer assembly of claim 15, wherein the lock ring includes at least one hole extending parallel to the bore and a fastener positioned in the hole, the fastener biasing the inner ring inwardly against the shaft.

22. The retainer assembly of claim 21, wherein the fastener biases the outer ring outwardly against the collar.

\* \* \* \* \*